United States Patent
Kitagawa

(10) Patent No.: US 7,065,590 B2
(45) Date of Patent: Jun. 20, 2006

(54) APPARATUS, METHOD AND COMPUTER PROGRAM PRODUCT FOR CONTROLLING ROUTING OF A REQUEST IN AN IMAGE INPUT APPARATUS

(75) Inventor: Eiichiro Kitagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 09/864,008

(22) Filed: May 23, 2001

(65) Prior Publication Data

US 2002/0013863 A1  Jan. 31, 2002

(30) Foreign Application Priority Data

May 24, 2000 (JP) .............................. 2000-153616

(51) Int. Cl.
*G06F 3/00* (2006.01)
*G06F 3/06* (2006.01)

(52) U.S. Cl. ..................... 710/5; 710/6; 710/3; 710/36; 710/38; 710/9; 710/15; 710/16

(58) Field of Classification Search ................... 710/15, 710/17, 19; 348/5, 6, 14.01, 143; 358/442; 725/148

See application file for complete search history.

(56) References Cited

U.S. PATENT DOCUMENTS

| | | | | |
|---|---|---|---|---|
| 5,315,705 A | * | 5/1994 | Iwami et al. | ................ 709/245 |
| 5,684,607 A | * | 11/1997 | Matsumoto | .................. 358/442 |
| 5,953,044 A | * | 9/1999 | Kato et al. | .................... 725/148 |
| 6,259,469 B1 | * | 7/2001 | Ejima et al. | ............. 348/14.01 |
| 6,327,267 B1 | * | 12/2001 | Valentine et al. | ........... 370/466 |
| 2003/0048356 A1 | * | 3/2003 | Kohno et al. | ................ 348/143 |

* cited by examiner

*Primary Examiner*—Kim Huynh
*Assistant Examiner*—Joshua D. Schneider
(74) *Attorney, Agent, or Firm*—Morgan & Finnegan, LLP

(57) ABSTRACT

In an image input apparatus which can be controlled by a host computer, and has a request sending unit for sending a request input by the user to the host computer, an internal command execution unit for executing the request, and a request route flag table which stores correspondence data of the request type and destination, the user input is accepted, a request in a predetermined format is generated on the basis of the accepted user input, and the generated request is sent to the request sending unit or command execution unit with reference to the request route flag table.

17 Claims, 11 Drawing Sheets

F I G. 5

| REQUEST ID | INPUT SOURCE ID | PARAMETER |

INPUT SOURCE ID : PANEL = 00、REMOTE CONTROLLER = 01、
CAMERA = 03

FIG. 6

| USER INPUT | REQUEST ID | PARAMETER | REQUEST INTERPRETATION | COMMAND ID | COMMAND INTERPRETATION |
|---|---|---|---|---|---|
| CAPTURE BUTTON DOWN | 01 | 01 | NONE | 01 | START IMAGE CAPTURE |
| CAPTURE BUTTON UP | 01 | 02 | NONE | NONE | NONE |
| ZOOM TELE BUTTON DOWN | 02 | 01 | START ZOOMING IN TELE-PHOTO DIRECTION | 02 | START ZOOMING IN TELE-PHOTO DIRECTION |
| ZOOM TELE BUTTON UP | 02 | 02 | STOP ZOOMING | 04 | STOP ZOOMING |
| ZOOM WIDE BUTTON DOWN | 03 | 01 | START ZOOMING IN WIDE DIRECTION | 03 | START ZOOMING IN WIDE DIRECTION |
| ZOOM WIDE BUTTON UP | 03 | 02 | STOP ZOOMING | 04 | STOP ZOOMING |
| FLIP BUTTON DOWN | 04 | 01 | FLIP IMAGE VERTICALLY | 05 | FLIP IMAGE VERTICALLY |
| FLIP BUTTON UP | 04 | 02 | NONE | NONE | NONE |

FIG. 7

| REQUEST ID | REQUEST ROUTE |
|---|---|
| 01 | 01(SEND TO HOST PC) |
| 02 | 00(INTERNAL INTERPRETATION/EXECUTION) |
| 03 | 00(INTERNAL INTERPRETATION/EXECUTION) |
| 04 | 00(INTERNAL INTERPRETATION/EXECUTION) |
| 05 | 01(SEND TO HOST PC) |

APPARATUS, METHOD AND COMPUTER PROGRAM PRODUCT FOR CONTROLLING ROUTING OF A REQUEST IN AN IMAGE INPUT APPARATUS

FIELD OF THE INVENTION

The present invention relates to an image input apparatus and, more particularly, to an image input apparatus which can be used as a standalone apparatus and can also be used to operate under the control of a personal computer connected thereto, and a control switching method.

BACKGROUND OF THE INVENTION

In a conventional image input apparatus, upon receiving user input for, e.g., controlling the image sensing direction of the image input apparatus from user input means such as a panel, remote controller, camera switch, or the like, that input is converted into a request inside a system, and the request is processed to implement a given function.

There are two modes, i.e., a local control mode and host control mode which differ from each other in method of processing a request.

In the local control mode for accepting user input only from the image input apparatus, all requests are interpreted by a request interpreter inside the apparatus, and processes are executed according to the interpretation results.

In the host control mode for accepting user input from both of the image input apparatus and the host computer, all requests by a user from user input means such as a panel, remote controller, camera switch, and the like are sent to a host computer connected without being interpreted inside the apparatus, and processes are executed upon receiving corresponding commands from the host computer.

FIG. 8 is a block diagram for explaining the process of the conventional image input apparatus in the local control mode, FIG. 9 is a block diagram for explaining the process of the conventional image input apparatus in the host control mode, FIG. 10 is a flow chart for explaining the operation of a user input process in the conventional image input apparatus, and FIG. 11 is a flow chart for explaining the operation of the conventional image input apparatus upon receiving a command from the host computer.

Since the local control mode is selected upon starting up the apparatus, a control mode determination unit 205 determines the local control mode. The operation at that time will be explained below with reference to FIGS. 8 and 10.

Upon receiving user input at a remote controller receiver 202 in step S201, a user input converter 204 generates a request corresponding to the user input in step S202. The request is sent to the control mode determination unit 205. Since the apparatus has initially been started up in the local control mode (NO in step S203), the request is sent to a request interpreter 206. In step S204, the request interpreter 206 converts the request into an internal command, and sends it to an internal command execution unit 207. In step S205, the internal command execution unit 207 executes the process. After the control mode is switched to the host control mode in a sequence to be described later, the request generated in step S202 is sent to the host computer in step S206 without being executed inside the apparatus.

Switching control from the local control mode to the host control mode, switching control from the host control mode to the local control mode, and control in the host control mode will be explained below.

Switching control to the host control mode will be described first with reference to FIGS. 8 and 11. Upon receiving a command from the host computer via a host interface 210 and command receiver 209 in step S210, the received command is sent to a command interpreter 211 and is converted into an internal command in step S211. The command interpreter 211 checks if the received command is a host control mode switch command. If the received command is the host control mode switch command (YES in step S212), the command interpreter 211 generates a corresponding internal command, and sends it to the internal command execution unit 207. The internal command execution unit 207 instructs the control mode determination unit 205 to switch the control mode to the host control mode, and the control mode determination unit 205 switches the control mode to the host control mode in step S213, thus ending the processing. Upon switching to the host control mode, a link state is changed to that shown in FIG. 9.

Switching control to the local control mode will be explained below with reference to FIGS. 9 and 11. If it is determined in step S212 that the command received in step S210 is not a host control mode switch command, the flow advances to step S214 to check if the received command is a local control mode switch command. If the received command is the local control mode switch command, the flow advances to step S215, and an internal command generated by the command interpreter 211 in step S211 is sent to the internal command execution unit 207. The internal command execution unit 207 instructs the control mode determination unit 205 to switch the control mode to the local control mode, and the control mode determination unit 205 switches the control mode to the local control mode, thus ending the processing. After that, upon receiving user input in step S201 in FIG. 10, the processes in steps S204 and S205 mentioned above are executed.

If it is determined in step S214 in FIG. 11 that the received command is not a local control mode switch command, the control mode determination unit 205 checks in step S216 if the current control mode is the host control mode. If NO in step S216, the received command is ignored, and the processing ends. On the other hand, if YES in step S216, the flow advances to step S217, and an internal command generated by the command interpreter 211 in step S211 is sent to the internal command execution unit 207. Then, the internal command execution unit 207 executes a process, thus ending the processing.

However, in the aforementioned system, since all requests, inputted to the image input apparatus, including those which need not be sent to the host computer are sent to the host computer in the host control mode, the processing on the host computer side unwantedly becomes complicated.

In the host control mode, since all user inputs are processed in the sequence of:
(1) a request is sent to the host;
(2) the host computer interprets the request;
(3) the host computer sends a command; and
(4) the command is received to execute a process, a large time lag is generated from each user input to execution of the process.

SUMMARY OF THE INVENTION

The present invention has been made in consideration of the above situation, and has as its object to shorten the time required from when user input is received until a corresponding process is executed, and to reduce the processing load on the host computer.

According to the present invention, the foregoing object is attained by providing an image input apparatus which can be controlled by an external control apparatus, comprising: request generation means for generating a request in a predetermined format on the basis of user input; sending means for sending the request generated by that request generation means to the external control apparatus; processing means for executing the request generated by that request generation means; memory for storing correspondence data of a request type and destination; and route determination means for sending the request generated by that request generation means to one of that sending means and that processing means with reference to the data stored in that memory.

According to the present invention, the foregoing object is also attained by providing a control method for controlling an image input apparatus which can be controlled by an external control apparatus, and has sending means for sending a request input by a user to the external control apparatus, processing means for executing the request, and memory for storing correspondence data of a request type and destination, comprising: a request generation step of generating a request in a predetermined format on the basis of user input; and a route determination step of sending the request generated in that request generation step to one of the sending means and the processing means with reference to the data stored in the memory.

Further, the foregoing object is also attained by providing a computer program product comprising a computer usable medium having computer readable program code means embodied in that medium for controlling an image input apparatus which can be controlled by an external control apparatus, and has sending means for sending a request input by a user to the external control apparatus, processing means for executing the request, and memory for storing correspondence data of a request type and destination, that product including: first computer readable program code means for generating a request in a predetermined format on the basis of user input; and second computer readable program code means for sending the request generated in that request generation step to one of the sending means and the processing means with reference to the data stored in the memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 5 shows a request format according to the embodiment of the present invention;

FIG. 6 is a table showing the relationship among requests, commands, and internal operations with respect to user inputs according to the embodiment of the present invention;

FIG. 7 shows an example of a request route flag table according to the embodiment of the present invention;

DETAILED DESCRIPTION OF THE PREFERRED EMBODIMENT

A preferred embodiment of the present invention will be described in detail in accordance with the accompanying drawings.

Figure 1:
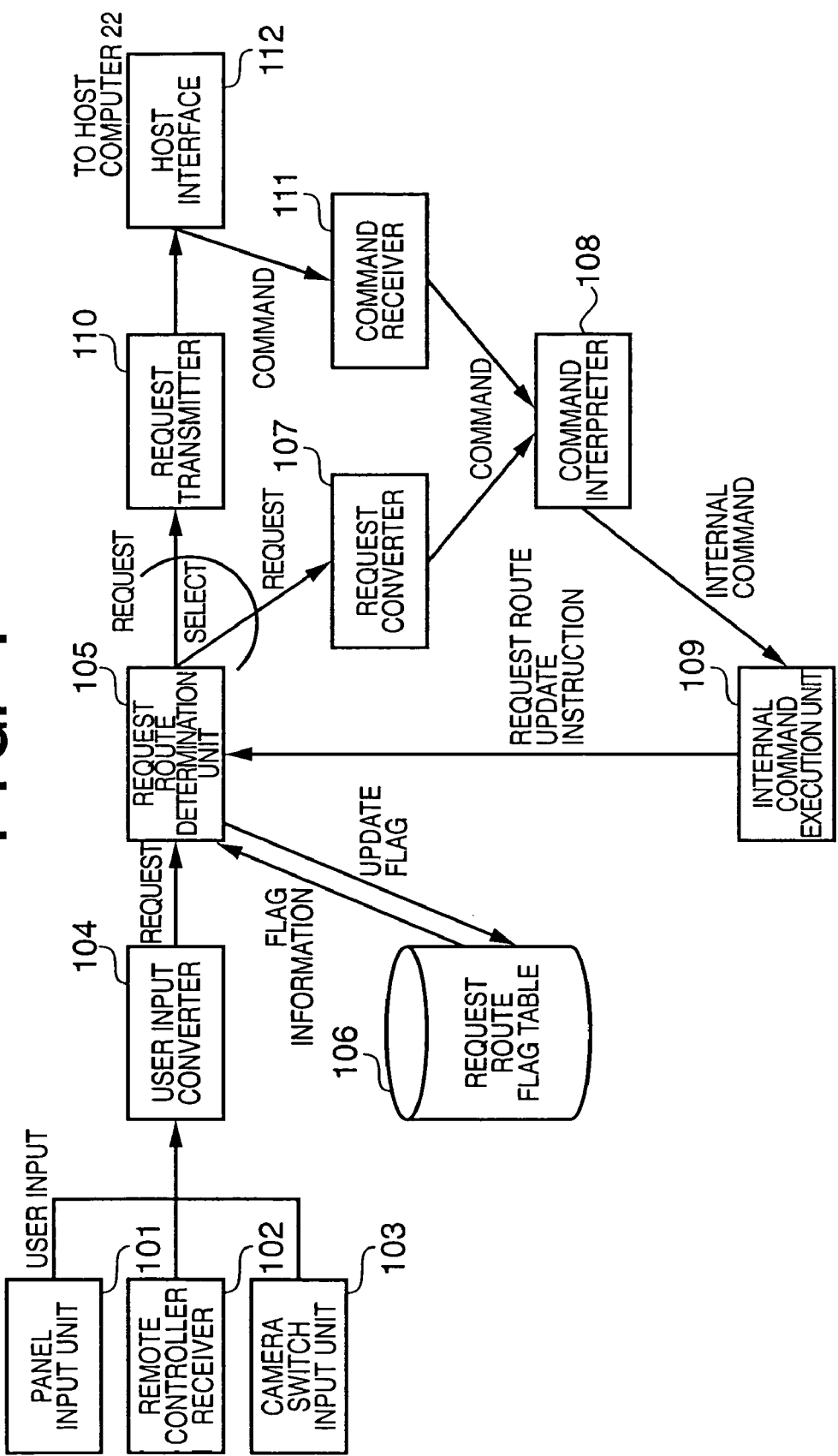
FIG. 1 is a block diagram for explaining the process in an image input apparatus according to an embodiment of the present invention.
Figure 2:
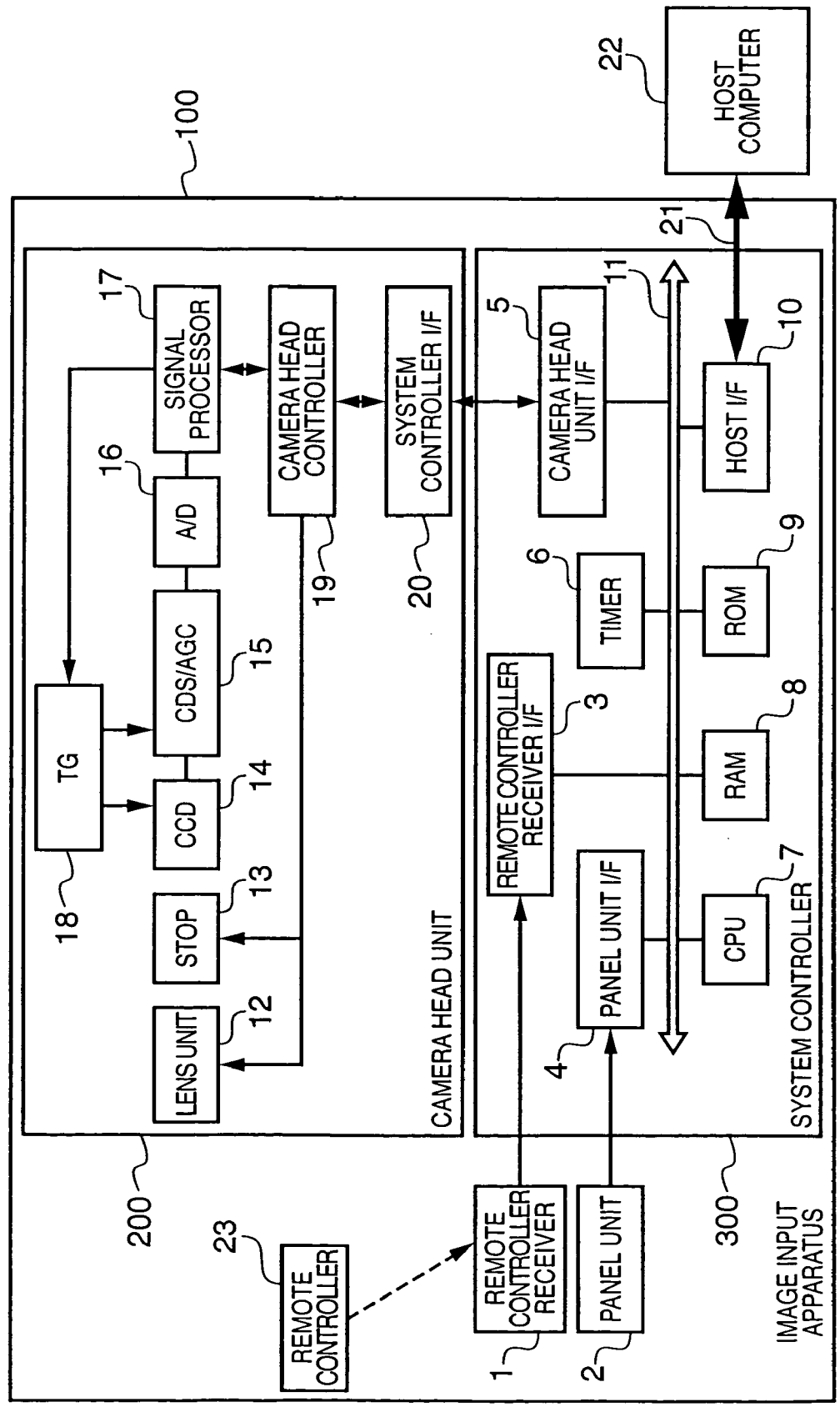
FIG. 2 is a block diagram showing the arrangement of the image input apparatus according to the embodiment of the present invention.

FIG. 1 is a block diagram for explaining the process of an image input apparatus according to an embodiment of the present invention, and FIG. 2 is a block diagram showing the arrangement of the image input apparatus in the embodiment of the present invention.

Referring to FIG. 2, reference numeral 100 denotes an image input apparatus in this embodiment, which is mainly constituted by a camera head unit 200 and system controller 300. Reference numeral 22 denotes a host computer which can control the image input apparatus 100.

The camera head unit 200 comprises a lens unit 12, a stop 13, an image sensing unit 14 such as a CCD or the like, a CDS/AGC unit 15 for performing a double-correlation sampling process and auto-gain control, an A/D converter 16, a signal processor 17, a timing signal generator (TG) 18 for controlling the operation timings of respective units, a camera head controller 19 for controlling the overall camera head unit 200, and a system controller I/F 20 for communicating with a system controller 300.

The system controller 300 comprises a remote controller receiver interface 3 for communicating with a remote controller receiver 1, a panel unit I/F 4 for communicating with a panel unit 2, a camera head unit I/F 5, a timer 6, a central processing unit (CPU) 7, a temporary storage device 8 such as RAM, an internal storage device 9, such as ROM, of the apparatus, and a host I/F 10 such as a USB interface or the like for communicating with the host computer 22, which are connected to a system bus 11.

Also, reference numeral 23 denotes a remote controller; 1, a remote controller receiver; 2, a panel unit; and 21, a USB cable.

When the user has pressed, e.g., a button of the remote controller 23, the remote controller receiver 1 receives a button-ON remote-control signal, and informs the remote controller receiver interface 3 of reception of that signal.

A request is sent to the host computer by the USB interface 10 via the USB cable 21 using USB interrupt transfer. Also, a command from the host computer 22 is received by the USB I/F 10 using USB control transfer.

A control instruction to the camera head unit 200 is sent to the camera head controller 19 via the camera head unit I/F 5 and system controller I/F 20, thus controlling the lens unit 12 and stop 13.

A video signal is sent from the signal processor 17 of the camera head unit 200 to the system controller 300 as a digital signal via the camera head controller 19, system controller interface 20, and camera head unit I/F 5.

Image transfer to the host computer 22 is done by the host I/F 10 such as a USB I/F or the like using USB bulk transfer via the USB cable 21.

The process of the image input apparatus 100 with the above arrangement will be described below with reference to FIGS. 1 to 7.

In this embodiment, a request input from a panel input unit 101, remote controller receiver 102, or camera switch input unit 103 is converted by a user input converter 104 into a format including a request ID, input source ID, and parameter, as shown in FIG. 5, and is distributed to a given destination using a request route flag table 106. FIG. 6 shows correspondence among request IDs, command IDs, and command interpretations, and FIG. 7 shows an example of the request route flag table 106. The host computer 22 may accept user input for controlling the image input apparatus 100, and in such a case, a command for controlling the image input apparatus 100 is generated in the host computer 22.

Figure 3:
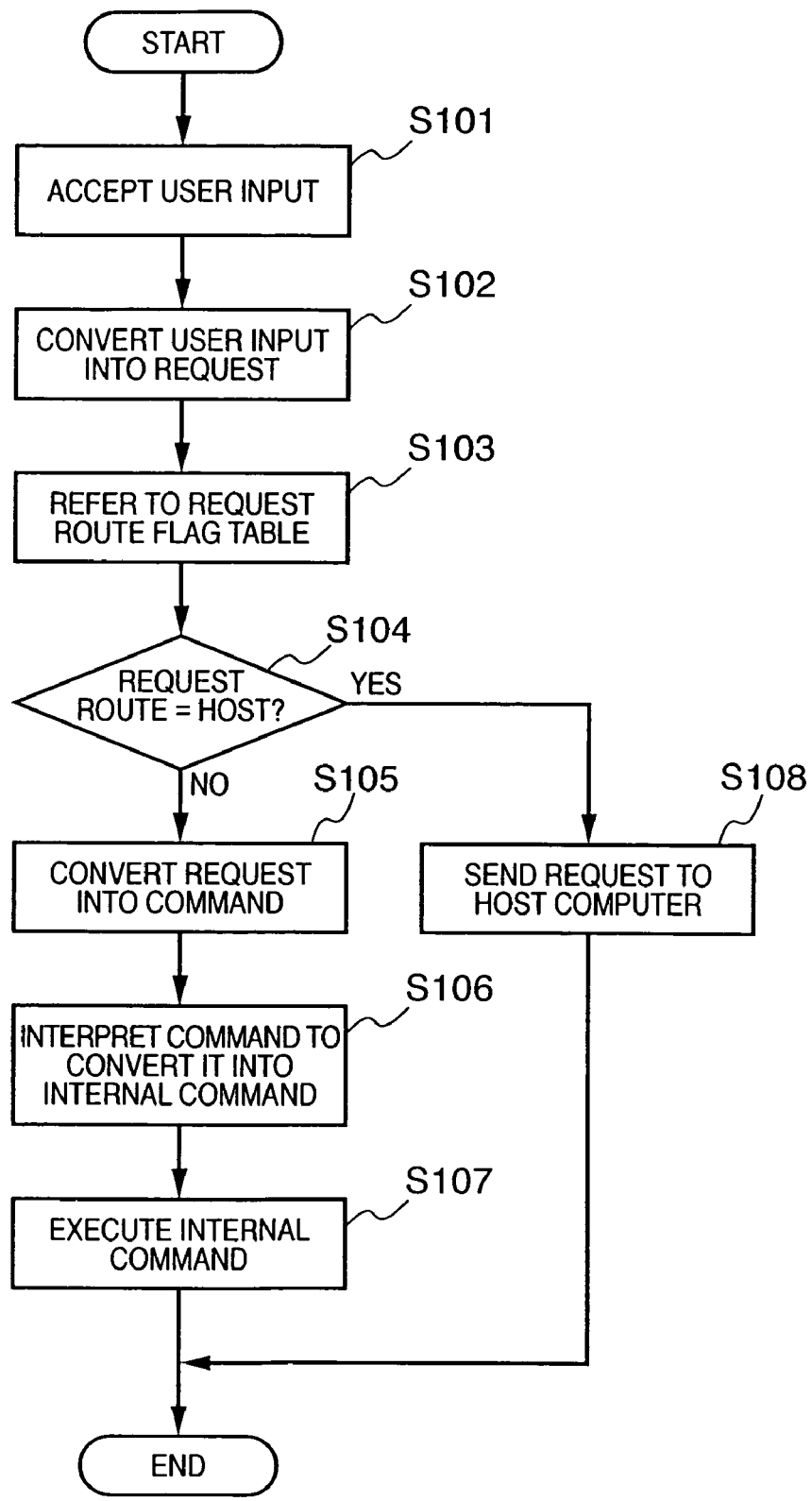
FIG. 3 is a flow chart showing the flow of a user input process according to the embodiment of the present invention.

Upon receiving user input from one of the panel input unit 101, remote controller receiver 102, and camera switch input unit 103 in step S101 in FIG. 3, the user input converter 104 generates a request corresponding to the user input in step S102. For example, if the user input is a zoom-in instruction (upon depression of ZoomTele button) from the remote controller 23, a request including request ID=02, input source=01, and parameter=01 is generated.

The generated request is sent to a request route determination unit 105. The request route determination unit 105 determines a destination (00 in the above example) corresponding to the request ID with reference to the request ID (02 in the above example) in the received request and flag information held in the request route flag table 106 in step S103. In the initial state, since all the request routes shown in FIG. 7 are set to "internal interpretation/execution" (00), NO is determined in step S104. Therefore, the request route determination unit 105 sends the request to a request converter 107, which converts the request into a command ID (=02) on the basis of information shown in FIG. 6 and sends it to a command interpreter 108 in step S105. The command interpreter 108 interprets the command ID (=02) to convert it into an internal command (start zooming in the tele-photo direction), and sends the command to an internal command execution unit 109 in step S106. The internal command execution unit 109 executes a process (zoom control in the Tele direction) in step S107.

When the request route flag table 106 is changed in a sequence to be described later, and a request route corresponding to the input request ID is changed to "send to host PC" (01), and the request route determination unit 105 determines in step S104 that the request ID is "send to host PC" (01), the flow advances to step S108, and the request input by the user is sent to the host computer 22 via a request transmitter 110 and host interface 112. For example, if the user input is depression of an image capture button (image sensing operation start button) of the camera switch input unit 103 (request ID=01, input source ID=03, parameter=01), and the contents of the request route flag table 106 have been updated as shown in FIG. 7, since a request route flag corresponding to request ID=01 is 01 (send to host PC), the input request is sent to the host computer 22. The reason for informing the image capture request to the host computer 22 is that the host computer 22 has to launch a predetermined application to prepare for processing image signals before image signals are transmitted from the image input apparatus 100, and the image capture starts after launching of the predetermined application is confirmed.

Figure 4:
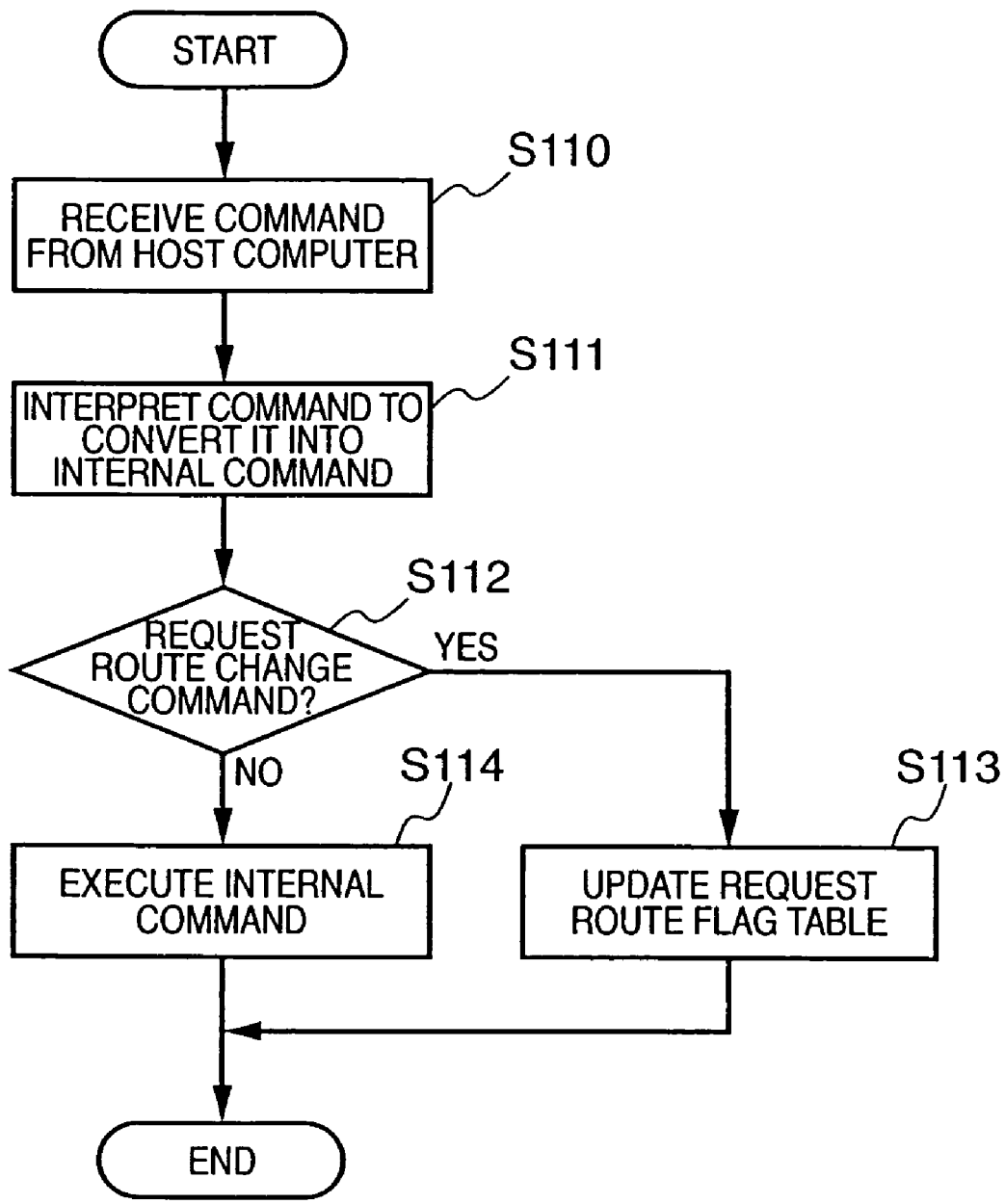
FIG. 4 is a flow chart showing the flow of a received command process according to the embodiment of the present invention.
Figure 8:
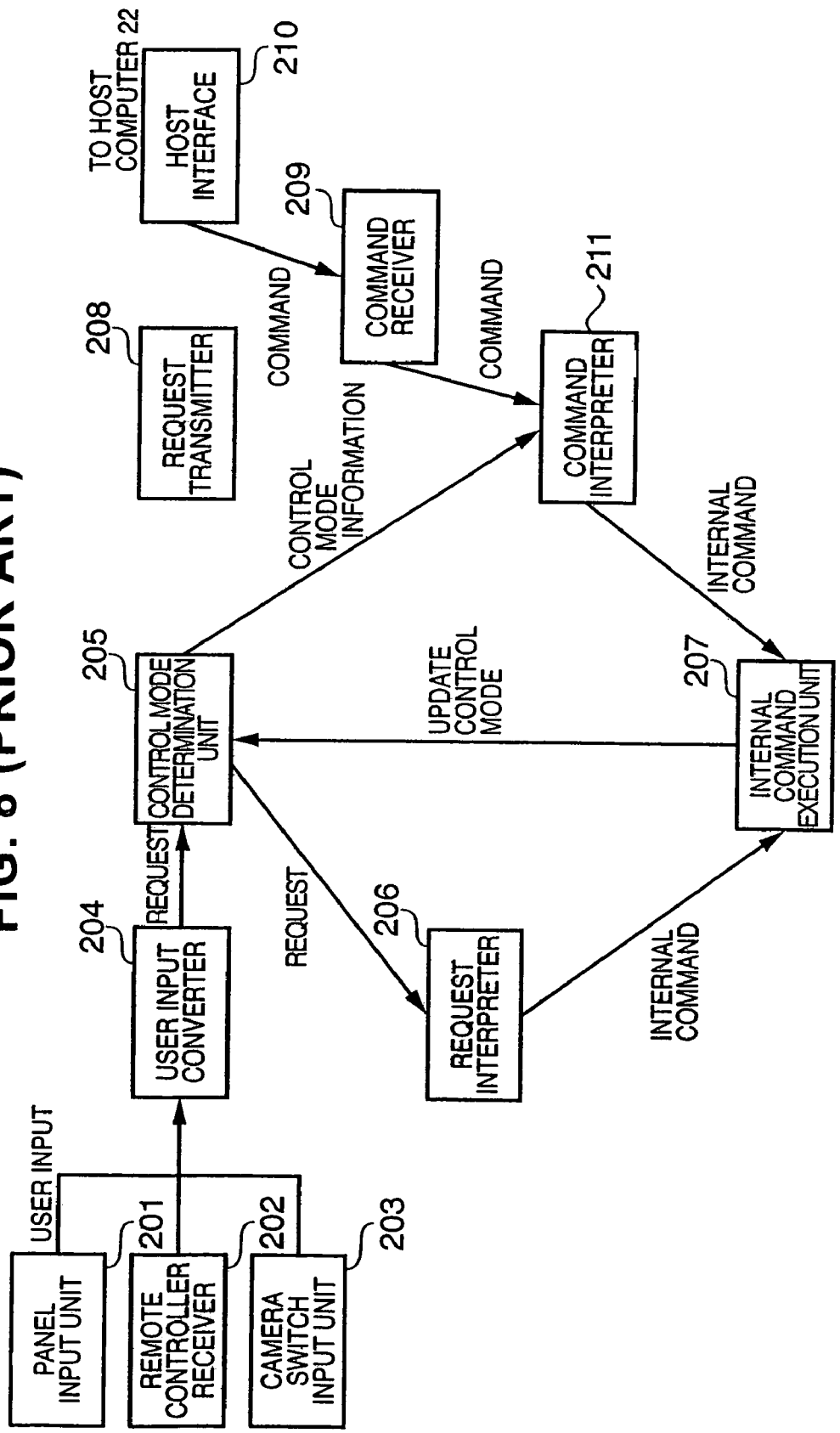
FIG. 8 is a block diagram for explaining the process of a conventional image input apparatus in a local control mode.
Figure 9:
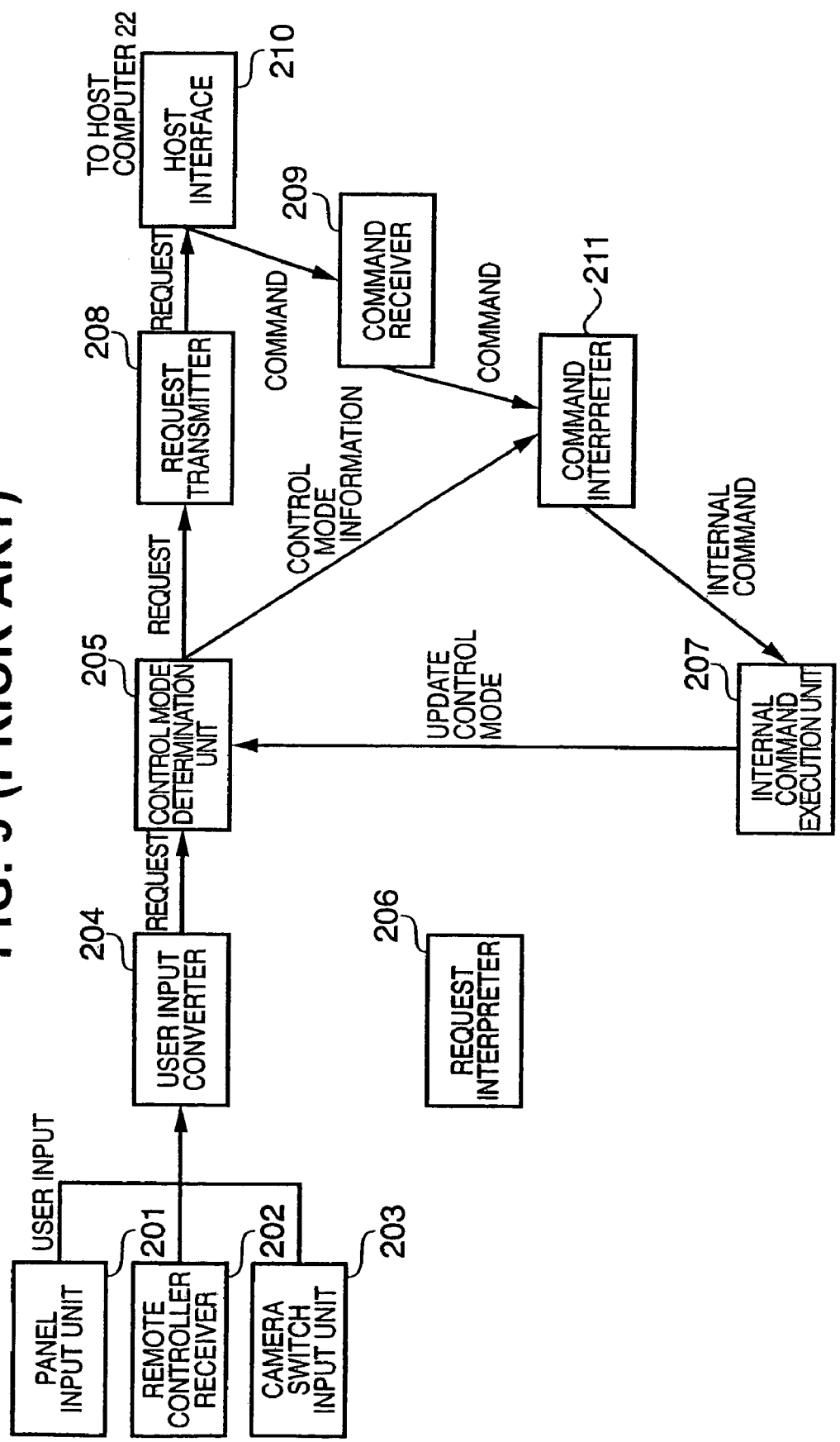
FIG. 9 is a block diagram for explaining the process of the conventional image input apparatus in a host control mode.
Figure 10:
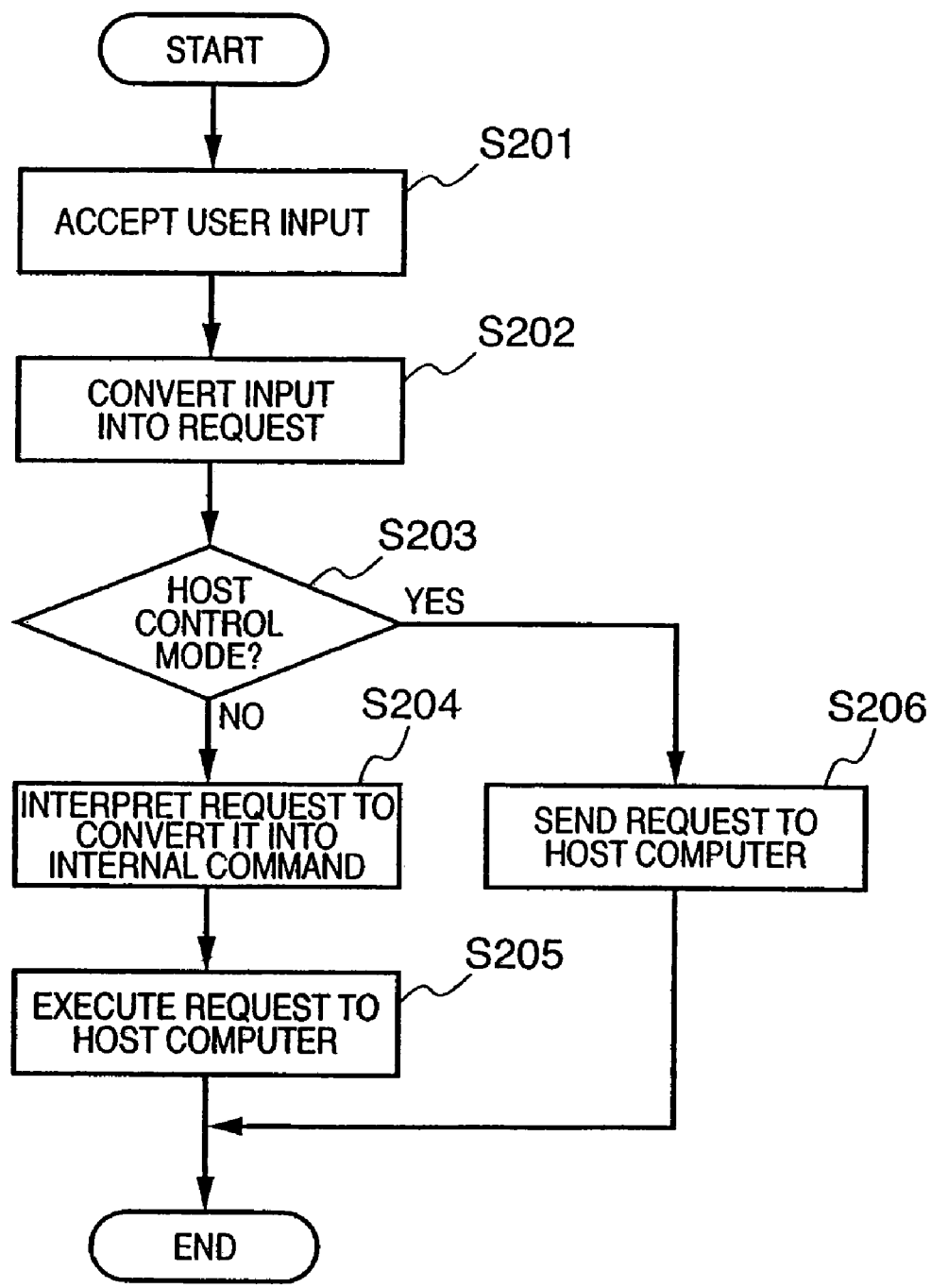
FIG. 10 is a flow chart for explaining the operation of a user input process in the conventional image input apparatus.
Figure 11:
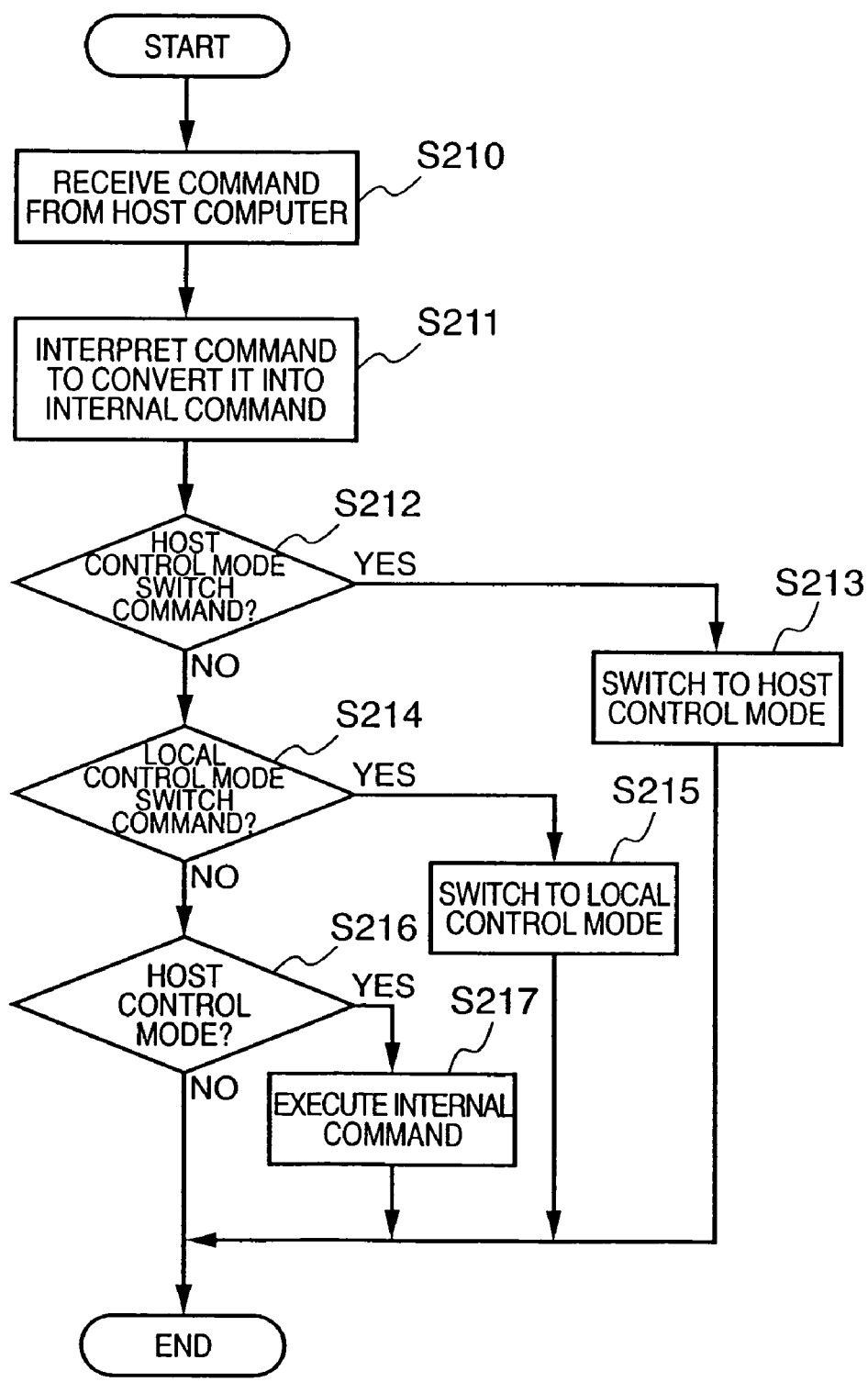
FIG. 11 is a flow chart for explaining a host input process in the conventional image input apparatus.

Further, if a command is sent from the host computer 22 via the host interface 112 in step S110 in FIG. 4, the command is received by a command receiver 111, and is sent to the command interpreter 108. The command interpreter 108 interprets the received command to generate an internal command and sends it to the internal command execution unit 109 in step S111. It is checked in step S112 if the internal command is a request route change command. If the internal command is not a request route change command (NO in step S112), the internal command is executed (step S114), thus ending the processing. On the other hand, if the internal command is a request route change command (YES in step S112), the flow advances to step S113 to instruct the request route determination unit 105 to change the request route. The request route determination unit 105 updates the corresponding flag on the request route flag table 106.

Note that the aforementioned process is saved in the ROM 9 in the apparatus, and a processing command is read out and executed by the CPU 7. All intermediate processing results are stored in the RAM 8.

The request route flag table 106 is saved in the ROM 9 as a default setup upon startup, and is stored in the RAM 8 after the apparatus has started up. After that, the flags are updated on the RAM 8.

As described above, according to this embodiment, requests corresponding to the user inputs are discriminated to send requests which must be sent to the host computer to the host computer, and to internally process other requests. Hence, the time required from when the user input is received until a process is executed can be shortened, and the processing load on the host computer can be reduced.

In the above description, the image input apparatus 100 is connected to the host computer 22. When the image input apparatus 100 is disconnected from the host computer 22, and a connection detection means (not shown) detects that the apparatus 100 is disconnected from the host computer 22, the request route determination unit 105 is controlled to send all requests input from the user input converter 104 to the request converter 107. Alternatively, the request route flag table 106 may be initialized.

<Other Embodiment>

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 3 and 4, or 6 and 7 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image input apparatus comprising;
    a camera unit for sensing images:
    an operation unit for controlling image sensing of said camera unit:
    a request generation unit for generating a request in a predetermined format on the basis of user input by said operation unit;
    a sending unit for sending the request generated by said request generation unit to an external control apparatus;
    a processing unit for executing the request generated by said request generation unit;
    a memory for storing correspondence data of a request type for controlling the image sensing and destination; and
    a route determination unit for sending the request generated by said request generation unit to one of said sending unit and said processing unit with reference to the data stored in said memory.

2. The apparatus according to claim 1, further comprising a reception unit for receiving a command from the external control apparatus,
    wherein said processing unit executes the command.

3. The apparatus according to claim 1, further comprising an update unit for updating the destination stored in said memory.

4. The apparatus according to claim 3, wherein destination is updated on the basis of a command from the external control apparatus.

5. The apparatus according to claim 1, further comprising:
    a detection unit for detecting a connection state with the external control apparatus,
    a connection stack implemented when said apparatus is not connected to the external control apparatus, and for controlling said route determination unit to send the request to said processing unit.

6. The apparatus according to claim 3, further comprising:
    a detection unit for detecting a connection state with the external control apparatus,
    wherein when said detection unit detects that said apparatus is disconnected from the external control apparatus, said update unit initializes the data in said memory.

7. The apparatus according to claim 1, wherein said memory stores said sending unit as destination of a request for starting the image sensing.

8. The apparatus according to claim 1, wherein said memory stores said processing unit as destination of a request for changing the image sensing parameters.

9. A control method for controlling an image input apparatus, the method comprising:
    a request generation step of generating a request in a predetermined format on the basis of user input by an operation unit; and
    a route determination step of sending the request generated in said request generation step to one of a sending unit and a processing unit with reference to the data stored in a memory,
    wherein the image input apparatus has which, has a camera unit for sensing images, the operation unit for controlling the image sensing, the sending unit for sending a request to an external control apparatus, the processing unit for executing the request, and the memory for storing correspondence data of a request type for controlling the image sensing and destination.

10. The method according to claim 9, further comprising a reception step of receiving a command from the external control apparatus, and wherein the processing unit executes the command.

11. The method according to claim 9, further comprising an update step of updating the destination stored in the memory.

12. The method according to claim 11, wherein the destination is updated on the basis of a command from the external control apparatus.

13. The method according to claim 11, further comprising:
    a detection step of detecting a connection state with the external control apparatus; and
    an initialization step of initializing the data in the memory when it is detected in said detection step that the image input apparatus is disconnected from the external control apparatus.

14. The method according to claim 9, further comprising:
    a detection step of detecting a connection state with the external control apparatus,
    wherein, when it is detected in said detection step that the image input apparatus is not connected to the external control apparatus, the request is sent to the processing unit in said route determination step.

15. The method according to claim 9, wherein the memory stores the processing unit as destination of a request for starting the image sensing.

16. The method according to claim 9, wherein the memory stores the sending unit as destination of a request for changing image sensing parameters.

17. A computer program product comprising a computer storage medium having computer readable program code embodied in said medium for controlling an image input apparatus, said product including:
    first computer readable program code for generating a request in a predetermined format on the basis of user input by an operation unit; and
    second computer readable program code for sending the request generated in said request generation step to one of a sending unit and a processing unit with reference to the data stored in a memory,
    wherein, the image input apparatus has a camera unit for sensing images, the operation unit for controlling the image sensing, the sending unit for sending a request to an external control apparatus, the processing unit for executing the request, and the memory for storing correspondence data of a request type for controlling the image sensing and destination.

* * * * *

UNITED STATES PATENT AND TRADEMARK OFFICE
CERTIFICATE OF CORRECTION

| | | |
|---|---|---|
| PATENT NO. | : 7,065,590 B2 | Page 1 of 1 |
| APPLICATION NO. | : 09/864008 | |
| DATED | : June 20, 2006 | |
| INVENTOR(S) | : Eiichiro Kitagawa | |

It is certified that error appears in the above-identified patent and that said Letters Patent is hereby corrected as shown below:

On the title page item (54), and col. 1, line 1, should read:

--APPARATUS, METHOD AND COMPUTER FOR PROGRAM PRODUCT FOR CONTROLLING ROUTING OF A REQUEST IN AN IMAGE INPUT APPARATUS--.

Signed and Sealed this

Twenty-sixth Day of December, 2006

JON W. DUDAS
*Director of the United States Patent and Trademark Office*